Figure 1:
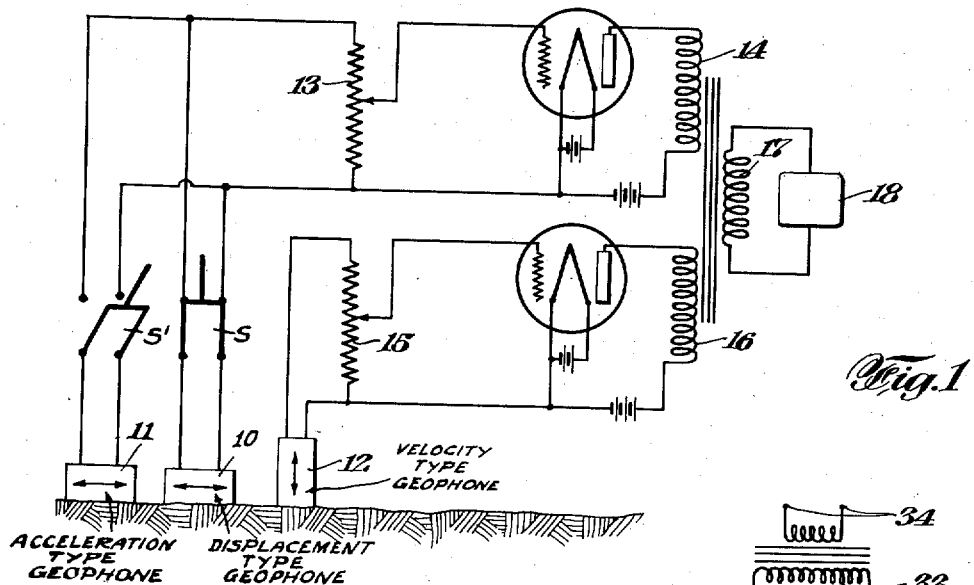

Sept. 30, 1941.                J. E. OWEN                2,257,187
                             SEISMIC SURVEYING
                           Filed Dec. 21, 1939

INVENTOR
John E. Owen
BY Kenyon & Kenyon
ATTORNEYS.

Patented Sept. 30, 1941

2,257,187

UNITED STATES PATENT OFFICE 2,257,187

SEISMIC SURVEYING

John E. Owen, Tulsa, Okla., assignor to Geophysical Research Corporation, New York, N. Y., a corporation of New Jersey Application December 21, 1939, Serial No. 310,378

3 Claims. (Cl. 177—352)

This invention relates to seismic surveying and this application is a continuation in part of John E. Owen Patent No. 2,216,452.

In the reflection wave method of seismic surveying, as heretofore practiced, the reflection wave record has been complicated by the effects produced by surface waves generated at the explosion of the shot. Such surface waves are the waves commonly known as "ground roll" which are of large amplitude and low frequency and travel out from the shot point along the surface of the earth. These waves are closely analogous to the surface waves known as "Rayleigh" waves which are a well-known type of wave produced as a result of natural earth quakes. The earth particles executing such a wave motion traverse an elliptical path and the motion of a particle is retrograde with respect to the direction of propagation of the wave.

An object of this invention is to eliminate the objectionable effects of surface waves from a reflection record.

According to the present invention, two electrical geophones are arranged at the recording station so close together that the movement thereof is substantially unitary. One of the geophones is so arranged that it is responsive only to the horizontal earth motion and the other geophone is so arranged that it is responsive only to the vertical earth motion. Each geophone is of a different type from the other and the two geophones are so related to each other that when subjected to the same earth motion, the output of one geophone is proportional to the time derivative of the output of the other geophone. A velocity type geophone may be used in combination with either a displacement type geophone or an acceleration type geophone as the output of a velocity type geophone is proportional to the time derivative of the output of a displacement type geophone when the geophones are subjected to the same earth motion and likewise the output of an acceleration type geophone is proportional to the time derivative of the output of a velocity type geophone under such circumstances. The outputs of the two geophones are fed into amplifiers and from the amplifiers into a recorder. The amplifiers are so adjusted as to balance out the surface wave components of the two geophone outputs so that the effects of the ground roll are eliminated from the reflection record produced by the apparatus.

The action of the two geophones above referred to in eliminating ground roll can be understood from the following considerations:

One of the geophones will respond only to vertical motion while the second geophone will respond only to horizontal motion. The displacement of both geophones when actuated by ground roll is the vector sum of a horizontal and a vertical component of displacement 90° out of phase. Since the earth motion of the ground roll is elliptical, the two components of the displacement may be represented by $x = B \cos \omega t$
$z = A \sin \omega t$ where $A$ = maximum amplitude of the vertical component of the motion
$B$ = maximum amplitude of the horizontal component of the motion
$x$ = horizontal displacement at time $t$
$z$ = vertical displacement at time $t$, and
$\omega = 2\pi f$, where $f$ = frequency of motion in cycles per second.

If the output of the geophone responsive to horizontal earth motion is proportional to the earth motion displacement, and the output of the geophone responsive to vertical earth motion is proportional to the earth motion velocity, it follows that since the earth motion velocity is the time derivative of the earth motion displacement, the surface wave output of the geophone responsive to vertical earth motion is proportional to $$A\omega \cos \omega t$$

It further follows that the surface wave electrical outputs of the recording amplifiers can be written respectively as $$kB \cos \omega t \text{ and } hA\omega \cos \omega t$$

where the values of $k$ and $h$ depend on the adjustment of the controls on the recording amplifiers. The sum of the surface wave electrical outputs of the two amplifiers, therefore, is $$(kB + hA\omega) \cos \omega t$$

and the effects of the surface wave may be completely eliminated by making the combined surface wave electrical output of the two amplifiers equal zero which may be accomplished by making $$kB = -HA\omega$$

which in turn may very simply be accomplished by adjusting the relative amplitudes of the two surface wave components by means of suitable controls on the recording amplifiers and connecting the amplifiers to the recorder in such manner that the surface wave output of one amplifier is supplied to the recorder 180° out of phase with the surface wave output of the other amplifier, thereby canceling the effects of the surface wave.

If the output of the horizontal geophone is proportional to earth motion acceleration, and the output of the vertical geophone is proportional to earth motion velocity, it follows from the fact that acceleration is the time derivative of velocity which in turn is the time derivative of displacement, that the surface wave output of the horizontal geophone is proportional to the second derivative of $B \cos \omega t$ or $-B\omega^2 \cos \omega t$ and that the surface wave output of the vertical geophone is proportional to the first derivative of $A \sin \omega t$ or $A\omega \cos \omega t$.

The sum of the surface wave outputs of the two amplifiers is $$(-k_1B\omega + h_1A)\omega \cos \omega t$$

where the values $k_1$ and $h_1$ depend on the adjustment of the controls on the recording amplifiers and the effects of the surface wave may be completely eliminated by making the combined surface wave output equal zero which is accomplished by making $$k_1B\omega = h_1A$$

which in turn is accomplished by adjusting the controls on the recording amplifiers and connecting them to the recorder in such manner that the surface wave output of one amplifier is supplied to the recorder 180° out of phase with the surface wave output of the other amplifier, thereby canceling the effects of the surface wave.

The two amplifiers are also acted upon by the reflected wave coming up nearly vertical from below, but only one geophone is responsive to such waves, that is, the geophone which is responsive to vertical earth motion. The reflection waves are therefore, recorded in the usual fashion while the ground roll is balanced out.

It is obvious from the foregoing description that a balance can be obtained for only a single frequency by the arrangement just described and that this frequency may be adjusted to the predominating frequency of the ground roll merely by varying the amplitudes of the two geophone outputs. Usually, most of the energy contained in the ground roll resides in a band close to one predominating frequency so that the above-described apparatus works very well.

Figures 2, 3:
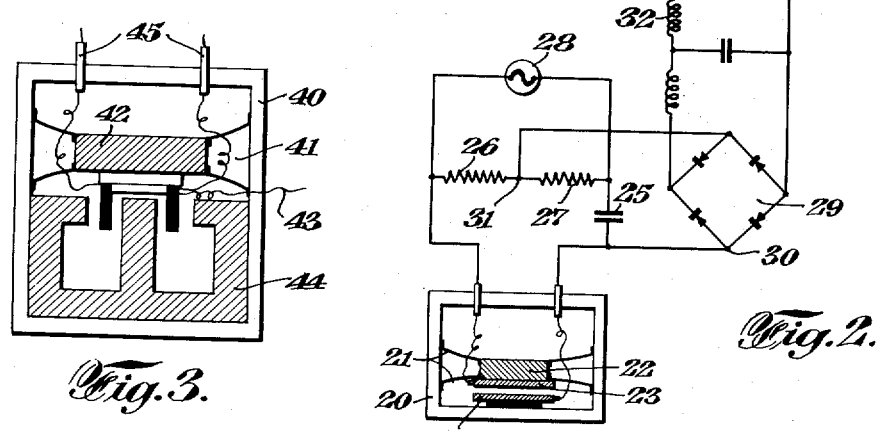
Figure 4:
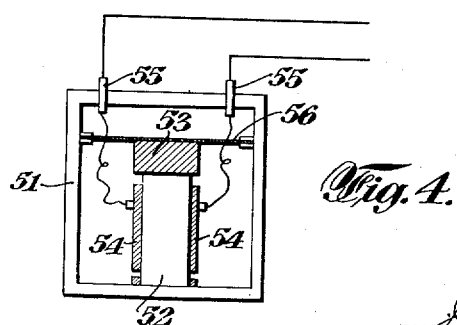

Other objects, novel features and advantages of this invention will become apparent from the following specification and accompanying drawing, wherein:

Fig. 1 is a diagrammatic illustration of a recording system embodying the invention;

Figs. 2, 3 and 4 respectively are diagrammatic illustrations of different types of geophones which may be used in the system of Fig. 1.

Fig. 1 is a composite illustration of two specific embodiments of the invention and in this figure are disclosed three geophones 10, 11 and 12, each of which is of a different type from each of the remaining two, it being understood that only two of the geophones are used in any embodiment of the invention. The geophone 10 is of the displacement type while the geophone 11 is of the acceleration type and the geophone 12 is of the velocity type. Each of the geophones 10 and 11 is illustrated as being arranged in a horizontal position with its axis pointing toward the shot point while the geophone 12 is illustrated as being arranged in vertcial position with its axis perpendicular to the axis of each of the remaining geophones. However, it is to be understood that in any combination of two geophones, one is to be arranged horizontally while the other is to be arranged vertically and it is immaterial which one is vertical and which is horizontal. The two geophones used in any embodiment of the invention are located so close to each other that they are acted upon in unison by earth motion. The output circuit of the geophone 10 is connected through a switch S and a voltage divider 13 with the output of the amplifier 14 which may consist of one or more stages of amplification while the output circuit of the geophone 11 is connected through a switch S₁ and the voltage divider 13 with the input of the amplifier 14. The output circuit of the geophone 12 is connected through a voltage divider 15 with the input circuit of an amplifier 16 which may consist of one or more stages of amplification. The outputs of the two amplifiers 14 and 16 are impressed through a transformer 17 on a recorder 18.

In one embodiment of the invention, the geophones 10 and 12 are used together, in which event the switch S is closed and the switch S₁ is opened, while in another embodiment of the invention, the geophone 10 is used in combination with the geophone 12 in which event the switch S₁ is closed and the switch S is opened. With either of the arrangements above referred to, the output of one geophone will be proportional to the time derivative of the output of the other geophone when both geophones are subjected to the same earth motion.

The geophone illustrated in Fig. 2 is of the displacement type and is illustrated in position to be responsive to vertical earth motion. The casing or framework 20 is rigidly attached to the ground and springs 21 suspend a weight 22 in the casing, the motion of the weight 22 being damped by any suitable means (not shown). A condenser plate 23 is carried by the weight 22 and a second condenser plate 24 is rigidly attached to the casing 20. The condenser plates 23 and 24 are included in one arm of a Wheatstone bridge, the other arms of which consist of a condenser 25 and the two resistances 26 and 27. The power for the operation of the Wheatstone bridge is supplied by a generator 28. A double wave rectifier 29 is connected to the terminals 30 and 31 of the Wheatstone bridge and the output of the rectifier is connected through a low pass electrical filter 32 and a transformer 33 to the terminals 34 which in turn are connected to the terminals of one of the voltage dividers 13 and 15 of Fig. 1. The Wheatstone bridge is adjusted so that it is somewhat unbalanced when the weight 22 is in its equilibrium position. Upon movement of the casing 20, due to ground motion, relative movement of the two condenser plates 23 and 24 is effected and the Wheatstone bridge circuit then becomes more or less unbalanced whereupon a varying voltage very nearly proportional to the varying displacement of the weight 22 is developed across the output terminals 34 so that the output of the geophone is very nearly proportional to the instantaneous displacement of the earth motion.

In Fig. 3, a velocity type geophone is illustrated as set up for operation in response to vertical earth motion. This geophone comprises a casing or framework 40 rigidly attached to the ground and in which springs 41 support a weight 42, means (not shown) being provided for damping the motion of such weight 42. A small coil 43 is attached to the weight 42 and moves in a radial magnetic field produced by a permanent magnet 44, the ends of the coil 43 being connected to output terminals 45 by means of which the geophone is connected to one of the voltage dividers 13 and 15 (Fig. 1). In this type of geophone, the output is proportional to the rate of cutting of the lines of magnetic force by the coil 22 so that the output is proportional to the velocity of the earth motion.

With one of the geophones 10 and 12 of Fig. 1 being a displacement type geophone and the other being a velocity type geophone, the electrical output of one of the geophones will be proportional to the time derivative of the electrical output of the other geophone, assuming that the period of oscillation and the damping ratio of the weight 22 of the displacement type geophone equal respectively to the free period of oscillation and the damping ratio of the weight 42 of the velocity type geophone. Therefore, by proper adjustment of the gain of the amplifiers 14 and 16, the effects of the surface waves may be balanced out.

The frequency of the voltage generated by the generator 28 must be much higher than any frequency in the ground motion to which the two groups may be subjected and the frequency of the generator 28 may, for instance, be 10,000 cycles per second. The cut-off frequency of the filter 32 would be greater than the highest frequency appearing in the ground motion, but must be below the frequency of the voltage generated by the generator 28. The electrical filter 32 may, therefore, be designed so as to cut off all frequencies above 1000 cycles per second.

In Fig. 4 is illustrated a geophone of the earth acceleration type, this geophone being shown in position to be responsive to vertical earth motion. Such geophone consists of a casing or framework 51 rigidly attached to the earth. A piezo-electric crystal 52, either quartz or Rochelle salt, is rigidly fastened to the casing 51 at its lower end. A weight 53 rests upon the upper end of the crystal. Two electrodes 54 are fastened on opposite faces of the crystal perpendicular to its piezo-electric axis, and these electrodes are connected to terminals 55 which in turn are connected to the terminals of one of the voltage dividers 13 and 15 of Fig. 1. A diaphragm 56 is attached both to the weight and to the casing. The diaphragm supports the weight when the geophone is in horizontal position and holds it against the end of the crystal. The weight 53 and thickness of the crystal 52 are so proportioned that the natural frequency of the system is many times greater than the highest frequency it is desired to record. The earth motion will then cause an electro-motive force to be developed between the electrodes and the crystal, which electro-motive force is proportional to the acceleration of the earth motion.

With one of the geophones 11 and 12 of Fig. 1 being a velocity type geophone and the other being an acceleration type geophone, the output of one of such geophones is proportional to the time derivative of the output of the other geophone. Therefore, as above pointed out, the effects of the surface waves may be balanced out by proper adjustment of the gain of the amplifiers 14 and 16.

With any of the above-described combinations of geophones, the connections from the geophone terminals to the voltage divider terminals are such that the outputs of the two amplifiers are impressed upon the recorder with the surface wave components of one output 180° out of phase with respect to the surface wave component of the other output. Also, with each of such combinations, amplifiers are so adjusted that the surface wave components of the two outputs are equal so that such components are balanced out and the effects of the ground roll are completely eliminated. The reflection record is, therefore, in no way complicated by the ground roll effects.

Other types of geophones than those above described may be utilized so long as the output of one geophone is substantially equal to the time derivative of the output of the other geophone when the same ground motion is applied to both of them. Also, the geophone may be any type of instrument which translates earth vibrations into electrical waves.

I claim:

1. Apparatus for receiving and recording artificial seismic waves comprising a pair of electrical geophones arranged so as to be substantially simultaneously actuated by earth motion, one of said geophones being responsive only to horizontal earth motion and the other geophone being responsive only to vertical earth motion and the electrical output of one geophone being the time derivative of the electrical output of the other geophone, a recorder, connections between both geophones and said recorder, and means in said connections for adjusting the amplitude of one geophone output relative to the amplitude of the other geophone output.

2. Apparatus according to claim 1 in which the electrical output of one geophone is proportional to the displacement of the earth motion and the electrical output of the other geophone is proportional to the velocity of the earth motion.

3. Apparatus according to claim 1 in which the electrical output of one geophone is proportional to the velocity of the earth motion and the electrical output of the other geophone is proportional to the acceleration of the earth motion.

JOHN E. OWEN.